(12) United States Patent
Manzoor (10) Patent No.: US 10,295,015 B2
(45) Date of Patent: May 21, 2019

(54) TORSIONAL VIBRATION DAMPERS HAVING DUAL ELASTOMERIC MEMBERS

(71) Applicant: Suhale Manzoor, Plymouth, MI (US)

(72) Inventor: Suhale Manzoor, Plymouth, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 429 days.

(21) Appl. No.: 14/843,320

(22) Filed: Sep. 2, 2015

(65) Prior Publication Data

US 2016/0061286 A1     Mar. 3, 2016

Related U.S. Application Data

(60) Provisional application No. 62/044,532, filed on Sep. 2, 2014.

(51) Int. Cl.
*F16F 15/30* (2006.01)
*B60K 25/02* (2006.01)
*F16H 55/36* (2006.01)

(52) U.S. Cl.
CPC .............. *F16F 15/30* (2013.01); *B60K 25/02* (2013.01); *F16H 55/36* (2013.01); *F16H 2055/366* (2013.01)

(58) Field of Classification Search
CPC .............................. F16F 15/1421; F16F 15/30
See application file for complete search history.

(56) References Cited

U.S. PATENT DOCUMENTS 2,898,777 A    8/1959   Boehm
3,200,485 A *   8/1965   McGavern, Jr. .... F16F 15/1442
                                          29/421.1
(Continued)

FOREIGN PATENT DOCUMENTS

EP        2392834       12/2011
FR        1212234        3/1960
(Continued)

OTHER PUBLICATIONS

Define radial—Google Search, google.com., May 15, 2018.*
(Continued)

*Primary Examiner* — Vinh Luong
(74) *Attorney, Agent, or Firm* — FisherBroyles, LLP; Susan M. Oiler (57) ABSTRACT

Torsional vibration dampers are disclosed that include a monolithic body having an axis of rotation, an innermost annular wall defining a bore therethrough for receiving a shaft, and an outer annular wall concentric about the axis of rotation and spaced radially outward relative to the innermost annular wall, an inertia member concentric about the axis of rotation and positioned radially inward relative to the outer annual wall, the inertia member having an inner surface facing the axis of rotation and an outer surface facing the outermost annular wall, a first elastomer member seated against the inner surface of the inertia member, and a second elastomer member seated against the outer surface of the inertia member and in between the inertia member and the outer annular wall. The first and second elastomer members operably couple the inertia member to the monolithic body for rotation therewith.

20 Claims, 8 Drawing Sheets

(56) References Cited

U.S. PATENT DOCUMENTS

| | | | | |
|---|---|---|---|---|
| 3,314,304 | A * | 4/1967 | McGavern, Jr. | F16F 15/136 |
| | | | | 74/574.3 |
| 3,495,459 | A * | 2/1970 | McLean | F16F 15/173 |
| | | | | 188/322.5 |
| 3,670,593 | A * | 6/1972 | Troyer | F16F 15/136 |
| | | | | 188/378 |
| 3,813,776 | A | 6/1974 | Frederickson et al. | |
| 4,041,803 | A | 8/1977 | Goloff et al. | |
| 4,815,332 | A | 3/1989 | Serizawa et al. | |
| 4,848,183 | A * | 7/1989 | Ferguson | F01L 1/02 |
| | | | | 74/574.4 |
| 4,895,047 | A * | 1/1990 | George | F16F 15/167 |
| | | | | 74/573.11 |
| 5,352,157 | A | 10/1994 | Ochs et al. | |
| 5,405,296 | A | 4/1995 | Cerny et al. | |
| 5,425,287 | A | 6/1995 | Beattie | |
| 5,449,322 | A | 9/1995 | Wagner | |
| 5,573,461 | A * | 11/1996 | Colford | F16D 3/62 |
| | | | | 464/83 |
| 6,089,204 | A * | 7/2000 | Shaffer | F16F 15/1435 |
| | | | | 123/192.1 |
| 6,171,194 | B1 | 1/2001 | Haga | |
| 6,386,065 | B1 | 5/2002 | Hodjat | |
| 8,136,621 | B2 | 3/2012 | Steyer et al. | |
| 9,599,209 | B2 * | 3/2017 | Manzoor | F16H 55/36 |
| 2003/0035966 | A1 | 2/2003 | Tagawa | |
| 2004/0108639 | A1 | 6/2004 | Kato et al. | |
| 2005/0050727 | A1 * | 3/2005 | Hodjat | B21D 53/261 |
| | | | | 29/893.32 |
| 2005/0116401 | A1 | 6/2005 | Kano | |
| 2006/0264282 | A1 | 11/2006 | Moriya et al. | |
| 2007/0249442 | A1 | 10/2007 | Grunau et al. | |
| 2009/0000422 | A1 * | 1/2009 | Christenson | F16F 7/108 |
| | | | | 74/574.4 |
| 2009/0105021 | A1 * | 4/2009 | Amati | H02K 7/1012 |
| | | | | 474/94 |
| 2009/0145261 | A1 | 6/2009 | Diaz | |
| 2010/0330352 | A1 * | 12/2010 | Feng | C08J 5/124 |
| | | | | 428/220 |
| 2012/0231909 | A1 | 9/2012 | Shin | |
| 2012/0325178 | A1 * | 12/2012 | Walters | F02B 77/08 |
| | | | | 123/197.4 |
| 2013/0068065 | A1 * | 3/2013 | Manzoor | F16F 7/108 |
| | | | | 74/574.4 |
| 2013/0095964 | A1 | 4/2013 | Shin | |
| 2013/0291677 | A1 | 11/2013 | Monzoor et al. | |
| 2014/0260782 | A1 * | 9/2014 | Paschen | F16F 7/108 |
| | | | | 74/574.4 |
| 2014/0329629 | A1 * | 11/2014 | Vukojicic | F16H 55/36 |
| | | | | 474/94 |
| 2017/0234419 | A1 * | 8/2017 | Manzoor | F16H 55/36 |
| | | | | 474/94 |

FOREIGN PATENT DOCUMENTS

| | | |
|---|---|---|
| JP | 2007-255432 | 10/2007 |
| JP | 2009-008237 | 1/2009 |
| WO | 2011141799 | 11/2011 |

OTHER PUBLICATIONS

Define monolithic—Google Search, google.com., May 17, 2018.*
Define one part—Google Search, google.com., May 17, 2018.*
Definition of Wall by Merriam-Webster, merriam-webster.com/dictionary/wall, Sep. 5, 2018. (Year: 2018).*
English Translation of JP 2007-255432 (Oct. 4, 2007).
English Translation of JP 2009-008237 (Jan. 15, 2009).
PCT, International Search Report and Written Opinion, PCT/US2015/035574 (dated Nov. 9, 2015).
PCT, International Search Report and Written Opinion, PCT/US2015/047853 (dated Dec. 18, 2015).
U.S., Non-Final Office Action, U.S. Appl. No. 14/303,074 (dated Dec. 23, 2015).
EP, Supplemental Search Report; European Application No. 15837370.4 (dated Mar. 28, 2018).
CN, First Office Action, Chinese Application No. 2015800472876 (dated Jul. 6, 2018).
CN, Search Report, Chinese Application No. 2015800472876 (dated Jul. 6, 2018).

* cited by examiner

FIG. 8

TORSIONAL VIBRATION DAMPERS HAVING DUAL ELASTOMERIC MEMBERS

RELATED APPLICATIONS

This application claims the benefit of U.S. Provisional Application No. 62/044,532, filed Sep. 2, 2014, the entirety of which is incorporated herein by reference.

FIELD OF THE DISCLOSURE

The present invention relates to torsional vibration dampers and, more particularly, to torsional vibration dampers having dual axially oriented elastomers, for example, for direct drive-type crankshaft dampers and drive line dampers.

BACKGROUND

Traditional torsional vibration dampers (TVDs) have a single mass-spring system for damping vibrations provided by a strip or ring of elastomer which simultaneously holds the hub and ring of the TVD with respect to each other. Of late, with the advent of Belt Start Generations (BSG) systems, there has been a need for TVDs with inertia rings integral with the hub such that the drive from the crankshaft to the belt is direct (not through the elastomer). However, where high frequencies are required from the TVD, such direct drive TVDs experience three major limitations:

(1) The elastomer compound used for the spring/damper system needs to be very hard. This is achieved by addition of carbon black (binder) that helps to raise the shear modulus of the compound used. However, the addition of carbon black causes two additional problems:
 (a) the assembly of the TVD becomes difficult and manufacturing problems such as hi-low elastomer, etc. cause an increase in scrap; and
 (b) the damping of the TVD increases to a level that the internal heat generated by the device during operation raises concerns over premature fatigue failure of the spring/damper (elastomer) system.

(2) The associated moment of inertia of the inertia ring becomes a concern, particularly where a large moment of inertia is desired. The larger the inertia I, the lower the frequency f, based on the equation:

$$f = \tfrac{1}{2}\pi\sqrt{(kt/I)} \quad (I)$$

where f=natural frequency, kt=torsional stiffness, and I=moment of inertia.

(3) The lack of packaging space available axially for a TVD with a single spring/damper system causes an issue because it limits the width of the elastomer and therefore its torsional stiffness kt based on the equation:

$$kt = \frac{\pi G W (Rid^2 Hod^2)}{(Rid^2 - Hod^2)} \quad (II)$$

where G=shear modulus, W=width of the elastomer, Rid=ring inner diameter, and Hod=hub outer diameter.

The torsional vibration dampers disclosed herein work to alleviate or reduce the potential for these problems by changing the noise, vibration, and harshness (NVH) structure of the problem.

SUMMARY

In one aspect, torsional vibration dampers are disclosed that have a monolithic body having an axis of rotation, an innermost annular wall defining a bore therethrough for receiving a shaft, and an outer annular wall concentric about the axis of rotation and spaced radially outward relative to the innermost annular wall, and an inertia member concentric about the axis of rotation and positioned radially inward relative to the outer annual wall. The inertia member has an inner surface facing the axis of rotation and an outer surface facing the outermost annular wall, and a first elastomer member seated against the inner surface of the inertia member and a second elastomer member seated against the outer surface of the inertia member and in between the inertia member and the outer annular wall. The first and second elastomer members operably couple the inertia member to the monolithic body for rotation therewith.

In another aspect, the torsional vibration dampers have the outer annular wall of the monolithic body concentric about the innermost annual wall and spaced radially outward therefrom thereby defining an annular cavity therebetween, in which is seated the inertia member with the first elastomer member in compression between the inertia member and the innermost annular wall. These aspects of the torsional vibration damper are suitable for damping vibrations in a drive line.

In another aspect, the monolithic body of the torsional vibration dampers has an intermediate annular wall concentric about the innermost annular wall and positioned between the innermost annular wall and the outer annular wall. The inertia member is seated between the intermediate annular wall and the outer annular wall with the first elastomer member in compression between the inertia member and an intermediate annular and the second elastomer member in compression between the inertia member and the outer annular wall. These aspects of the torsional vibration damper are suitable for damping vibrations in a front end accessory drive, in particular vibrations of a crank shaft.

In another aspect, the monolithic body has the innermost annular wall and the outer annular wall extending radially outward in opposite directions from a plate portion thereof. Here, the first elastomer member is in compression between the inertia member and the shaft.

For those torsional vibration dampers intended receipt of a crankshaft to dampen crankshaft vibrations, the radially outermost surface of the outer annular wall may define a belt engaging surface. The belt engaging surface may be flat or may include ribs. The ribs may be V-ribs. For those torsional vibration dampers intended for damping vibrations in a drive line, a belt engaging surface may not be needed.

In all the aspects set forth above, at least one of the first and second elastomer members may be adhesively bonded or, alternatively, mold-bonded to the inertia member, and the inertia member may be generally I-shaped in cross-section, the cross-section being taken parallel to the axis of rotation. When the inertia member is generally I-shaped in cross-section, the first and second elastomer members are seated in opposing recesses defined by the generally I-shaped cross-section.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
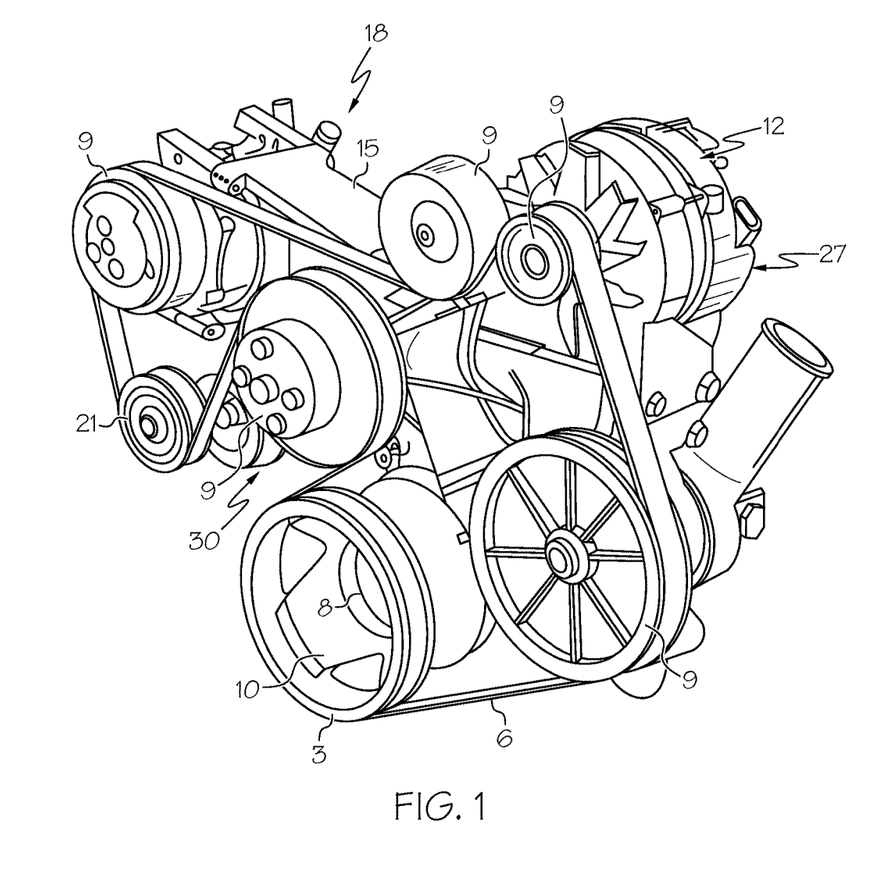
FIG. 1 is a perspective view of components in a front end accessory drive.

Referring now to FIG. 1, an example of one embodiment of a FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depends upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. For example, a vacuum pump, a fuel injection pump, an oil pump, a water pump, a power steering pump, an air conditioning pump, and a cam drive are examples of other engine drive accessories 9 that may be mounted on the integrated housing 15, for incorporation into the FEAD system 18. The engine drive accessories 9 are preferably mounted to the integrated housing 15 by bolts or the like at locations along the surface that are tool accessible for easy mounting and also service accessible. In FIG. 1, the integrated housing 15 has a plurality of engine drive accessories 9 including an alternator 12 and a belt tensioner 21.

The engine drive accessories 9 are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12. The belt tensioner 21 automatically adjusts the tension of the endless drive belt 9 to keep it tight during operation and also prevent wear.

Figure 3:
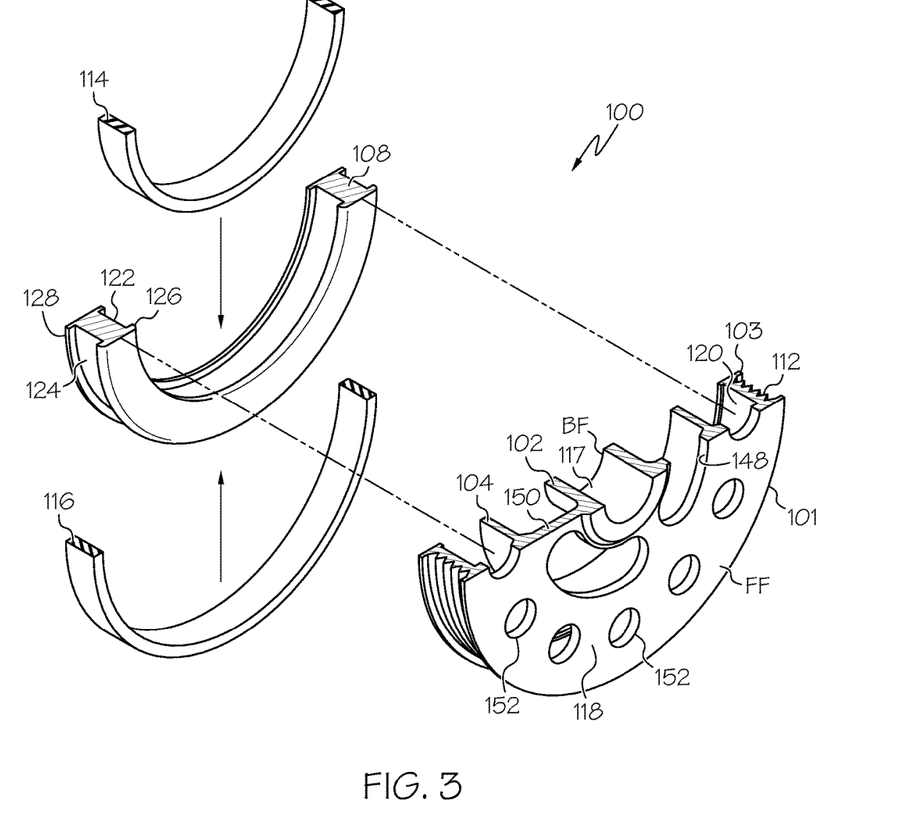
FIG. 3 is a perspective, exploded, cross-sectional view taken parallel to the axis of rotation of a torsional vibration damper mountable on a shaft such as a crankshaft.
Figure 4:
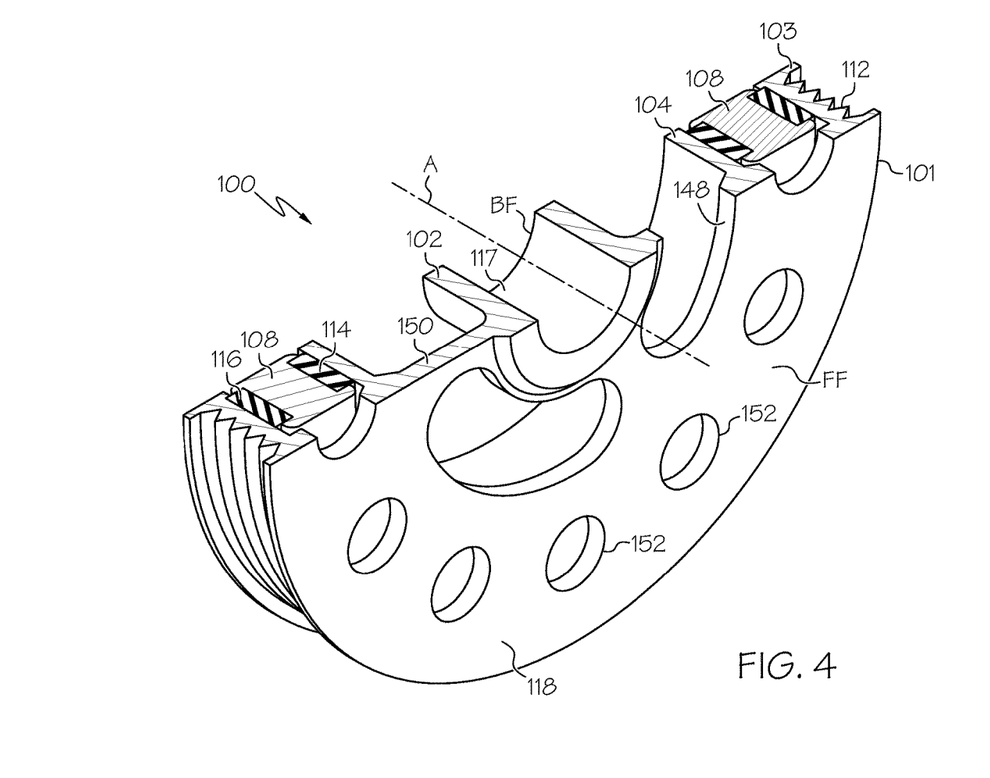
FIG. 4 is a perspective, assembled view of the torsional vibration damper of FIG. 3.

The improvement to the FEAD system 18 herein is a torsional vibration damper, generally designated by reference 100, exemplified in FIGS. 3 and 4 that is a direct drive TVD having dual elastomer members. The monolithic member 101 provides for a "direct" drive system, i.e., one where the endless belt rides on a belt engaging surface 112 of the hub, innermost annular wall 102, itself. A benefit to this construction is that the belt-engaging surface 112 will oscillate with reduced amplitude compared to an "indirect" drive system, i.e., one where the endless belt rides the inertia member which is indirectly coupled to the hub and is tuned to oscillate with an enhanced magnitude that is out of phase relative to the angular amplitude of vibration of the hub/crankshaft. This construction is advantageous in that it eliminates or reduces the potential slip in/at the elastomer-pulley body interface and/or the elastomer-inertia ring interface that occurs during belt start-stop scenarios in existing torsional vibration dampers.

Figure 5:
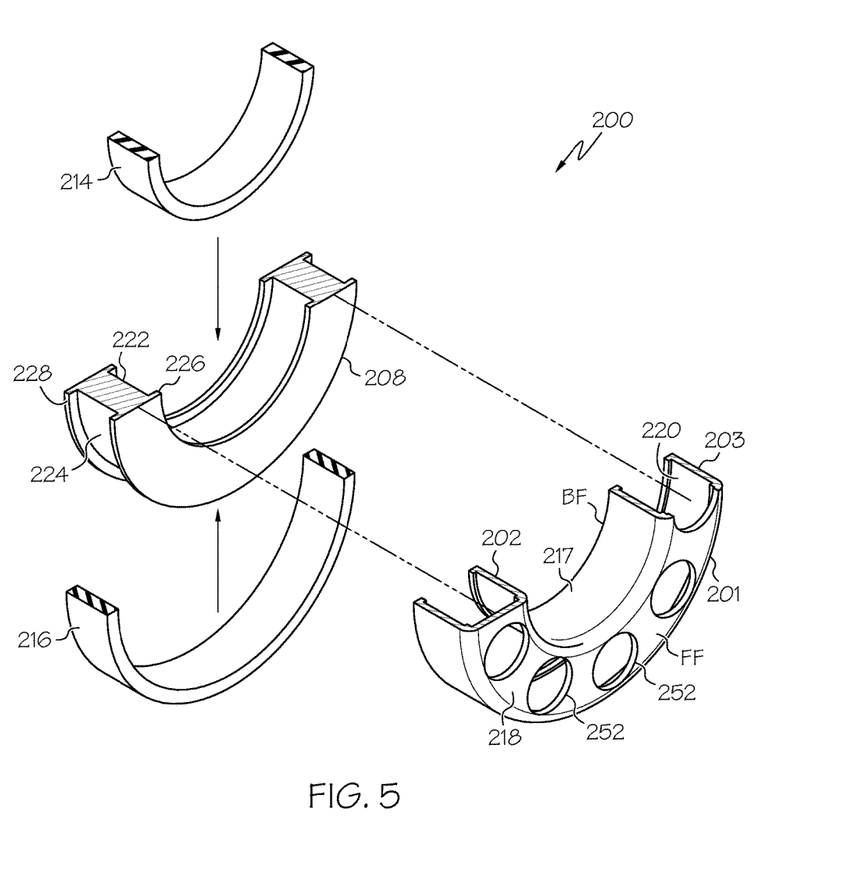
FIG. 5 is a perspective, exploded, cross-sectional view taken parallel to the axis of rotation of a torsional vibration damper for a drive line.
Figure 6:
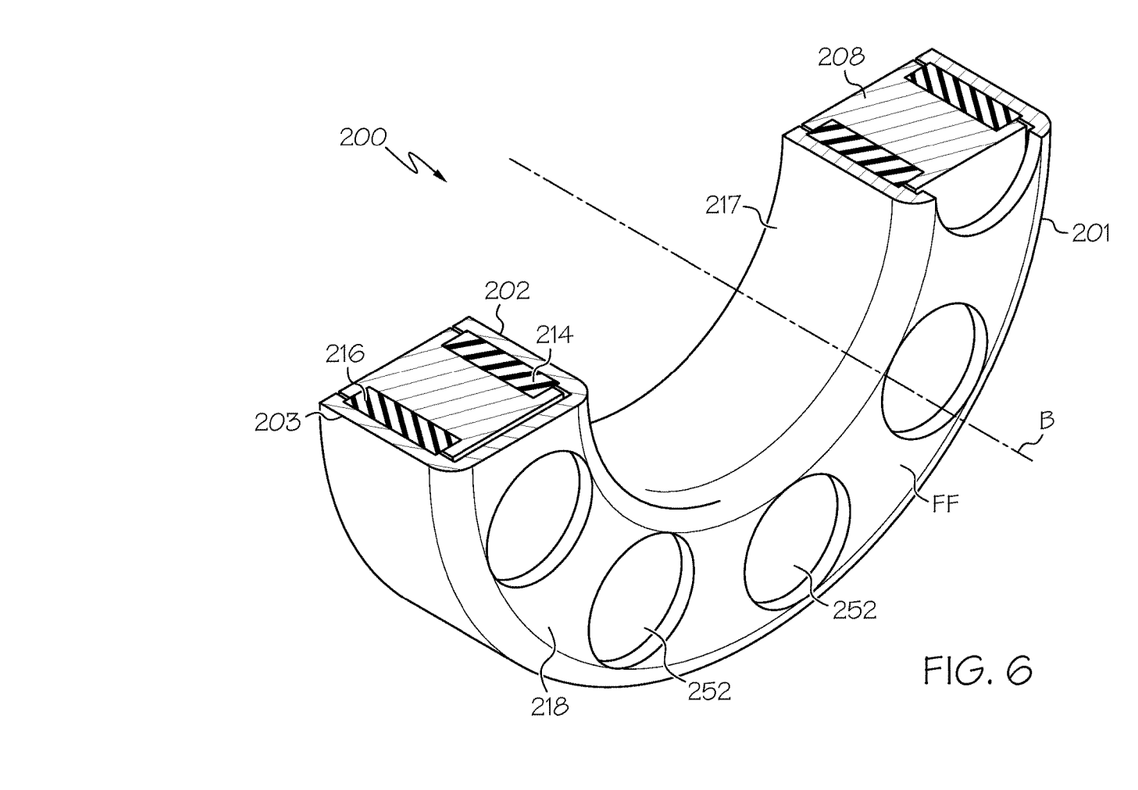
FIG. 6 is a perspective, assembled view of the torsional vibration damper of FIG. 5.

The torsional vibration dampers are not limited to the FEAD system as a crankshaft damper, but may also be a drive line damper as depicted in FIGS. 5 and 6 or other types of dampers.

Referring now to FIGS. 3 and 4, the torsional vibration damper 100 has a monolithic member 101 having an innermost annular wall 102 defining a bore 117 through the torsional vibration damper, an outermost annular wall 103 concentric about the innermost annular wall 102 and spaced radially outward therefrom. The bore 117 is configured to receive and be coupled to a shaft, such as a crankshaft, for rotational movement therewith, and the outermost annular wall 103 defines an outer belt-engaging surface 112. The monolithic member 101 also includes an intermediate annular wall 104 disposed between the innermost annular wall 102 and the outermost annular wall 103. The intermediate annular wall 104 is concentric about the inner most annular wall 102 and spaced radially outward therefrom and is radially inward from the outermost annular wall 103. These three annular walls 102, 103, 104 of the pulley body-hub monolithic member 101 are stabilized relative to one another by a plate 118 extending radially outward from the innermost annular wall 102 until it terminates at the outermost annular wall 103. The plate 118 may include a plurality of apertures 148 extending axially therethrough thereby defining a plurality of spokes 150 between the innermost annular wall 102 and a plurality of voids 152 between the intermediate annular wall 104 and the outermost annular wall 103. The apertures 148 and the voids 152 reduce the overall weight of the torsional vibration damper 100.

As seen in FIGS. 3 and 4, the three annular walls 102, 103, and 104 may each extend axially in only one direction from the plate 118 thereby defining the back face BF of the torsional vibration damper 100. Opposite thereof the plate 118 itself defines the front face FF of the torsional vibration damper 100.

The belt engaging surface 112 may be flat, contoured to receive a rounded belt, or have V-grooves for mating with the V-ribs of a V-ribbed belt or any other required contoured groove to mate with an endless belt.

An inertia member 108 is seated between the intermediate annular wall 104 and the outermost annular wall 103 in a cavity 120 defined therebetween that is open facing the back face BF and is generally closed by plate 118 facing the front face FF of the TVD. The inertia member 108 has an inner surface 122 facing the intermediate annular wall 104 and an outer surface 124 facing the outermost annular wall 103. A first elastomer member 114 is disposed between the inner surface 122 of the inertia member 108 and the intermediate annular wall 104, and a second elastomer member 116 is disposed between the outer surface 124 of the inertia member 108 and the outermost annular wall 103. The first and second elastomer members 114, 116 may be seated against the inertia member 108 and then inserted into the cavity 120, or alternately, press fit or injected into a gap between the inertia member 108 and the respective walls of the monolithic member 101 after the inertia member 108 is seated in the cavity 120. Regardless of the assembly means, the first and second elastomer members 114, 116 are typically in compression against the respective walls 103, 104 of the monolithic member 101. Accordingly, the first and second elastomer members 114, 116 non-rigidly couple the inertia member 108 to the monolithic member 101 for rotation therewith to dampen and/or absorb the vibrational frequencies of a rotating member, such as a shaft. Generally, there is no relative rotation of any components and no translation of any components relative to another component in the torsional vibration damper 100.

To assist in retaining the first and second elastomer members 114, 116 against the inertia member 108, the inertia member 108 may include a front face-facing flange 126 and a back face-facing flange 128, which gives the inertia member an I-beam shaped cross-sectional profile as seen in FIG. 3, but these are not required, and are optional in all constructions disclosed herein. This configuration is a single-recessed structure with the recesses receiving the first and second elastomer members 114, 116 being present in the inertia member 108. Further, the surface of the intermediate annular wall 104 facing the inertia member 108 may include a recess (not shown) sized and shaped to receive the first elastomer member 114 and the surface of the outermost annular wall 103 facing the inertia member 108 may include a recess (not shown) sized and shaped to receive the second elastomer member 116. This alternate configuration is a dual-recessed structure. These recesses retain the first and second elastomer members to prevent sliding and for the purpose of alignment of the components. Alternately, only the respective walls 103, 104 may include the recesses for receiving the first and second elastomer members.

The monolithic member 101 may be cast, spun, forged, machined, or molded using known or hereinafter developed techniques. Suitable material for the pulley body-hub monolithic member 101 includes iron, steel, aluminum, other suitable metals, plastics, or a combination thereof, including composite materials. The inertia member 142 may be made from any material having a sufficient inertia, usually cast iron, steel, or similar dense material.

The first and second elastomeric members 114, 116 may be any suitable elastomer to absorb and/or dampen the torsional vibrations generated by a rotating shaft upon which the TVD 100 is to be mounted. The elastomer is preferably one suitable for automotive engine applications, i.e., suitable to withstand temperatures experienced in the engine and road temperatures and conditions. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomer member may be a composite material that optionally includes a plurality of fibers dispersed therein. The fibers may be continuous or fragmented (chopped) aramid fiber like the fiber sold under the name TECHNORA® fiber.

In all of the constructions disclosed herein, one or both of the first or second elastomer members 114, 116 may be attached to the inertia member 108 and/or the monolithic member 101 using a conventional adhesive known for use in vibration damping systems. Some examples of suitable adhesives include rubber bonding adhesives sold by the Lord Corporation, Henkel AG & Co., or Morton International Incorporated Adhesives & Specialty Company. The use of the adhesive may be in addition to a configuration that is a single-recessed structure or a dual-recessed structure, as described above, or to the exclusion thereof. Moreover, one of the first elastomer members may be single-recessed or dual-recessed structure and the second elastomer member may be only retained by an adhesive.

In all of the constructions disclosed herein, rather than using an adhesive, one or both of the first and second elastomer members 114, 116 may be mold-bonded to the inertia member 108. The use of the mold-bonding may be in addition to a configuration that is a single-recessed structure or a dual-recessed structure, as described above, or to the exclusion thereof. Moreover, one of the first elastomer members may be single-recessed or dual-recessed structure and the second elastomer member may be only retained because it is mold-bonded.

As shown in FIGS. 3 and 4, the inertia member 108 has a straight profiled geometry for the inner surface 122 and the outer surface 124 against which the first and second elastomer members 114, 116 are seated. In another aspect, the inertia member 108 may have a curved profiled geometry as taught in U.S. Published Application 2013/0291677 and U.S. Co-pending application Ser. No. 14/303,074.

Now referring to FIGS. 5 and 6, a torsional vibration damper 200 for a drive line is illustrated, which includes a monolithic body 201 having an innermost annular wall 202 defining a bore 217 therethrough and an outer annular wall 203 concentric about the innermost annular wall 202 and spaced radially outward therefrom thereby defining an annular cavity 220 therebetween.

An inertia member 208 is seated between the innermost annular wall 202 and the outer annular wall 203 in the cavity 220 defined therebetween that is open facing the back face BF and is generally closed by a plate 218 facing the front face FF of the TVD. The inertia member 208 has an inner surface 222 facing the innermost annular wall 202 and an outer surface 224 facing the outer annular wall 203. A first elastomer member 214 is disposed between the inner surface 222 of the inertia member 208 and the innermost annular wall 202, and a second elastomer member 216 is disposed between the outer surface 224 of the inertia member 208 and the outer annular wall 203. The first and second elastomer members 214, 216 may be seated against the inertia member 208 and then inserted into the cavity 220, or alternately, press fit or injected into a gap between the inertia member 208 and the respective walls 202, 203 after the inertia member 208 is seated in the cavity 220. Regardless of the assembly means, the first and second elastomer members 214, 216 are typically in compression against the respective walls of the monolithic member 201. Accordingly, the first and second elastomer members 214, 216 non-rigidly couple the inertia member 208 to the monolithic member 201 for rotation therewith to dampen and/or absorb the vibrational frequencies of a rotating member. Generally, there is no relative rotation of any components and no translation of any components relative to another component in the torsional vibration damper 200.

To assist in retaining the first and second elastomer members 214, 216 against the inertia member 208, the inertia member 208 may include a front face-facing flange 226 and a back face-facing flange 228, which gives the inertia member an I-beam shaped cross-sectional profile as seen in FIG. 5, but these are not required, and are optional in all constructions disclosed herein. This configuration is a single-recessed structure with the recesses receiving the first and second elastomer members 214, 216 being present in the inertia member 208. Further, the surface of the innermost annular wall 202 facing the inertia member 208 may include a recess (not shown) sized and shaped to receive the first elastomer member 214 and the surface of the outer annular wall 203 facing the inertia member 208 may include a recess (not shown) sized and shaped to receive the second elastomer member 216. This alternate configuration is a dual-recessed structure. These recesses retain the first and second elastomer members to prevent sliding and also provide for alignment of the components. Alternately, only the respective walls 202, 203 may include the recesses for receiving the first and second elastomer members.

The plate 218 may include a plurality of voids 252 to reduce the weight of the TVD 200.

The components of TVD 200 may be made of the same types of materials described above with respect to TVD 100, and as described above may mix and match the various means for retaining the elastomer member such as using a single-recessed structure, a dual-recessed structure, adhesive, and mold-bonding.

Figure 7:
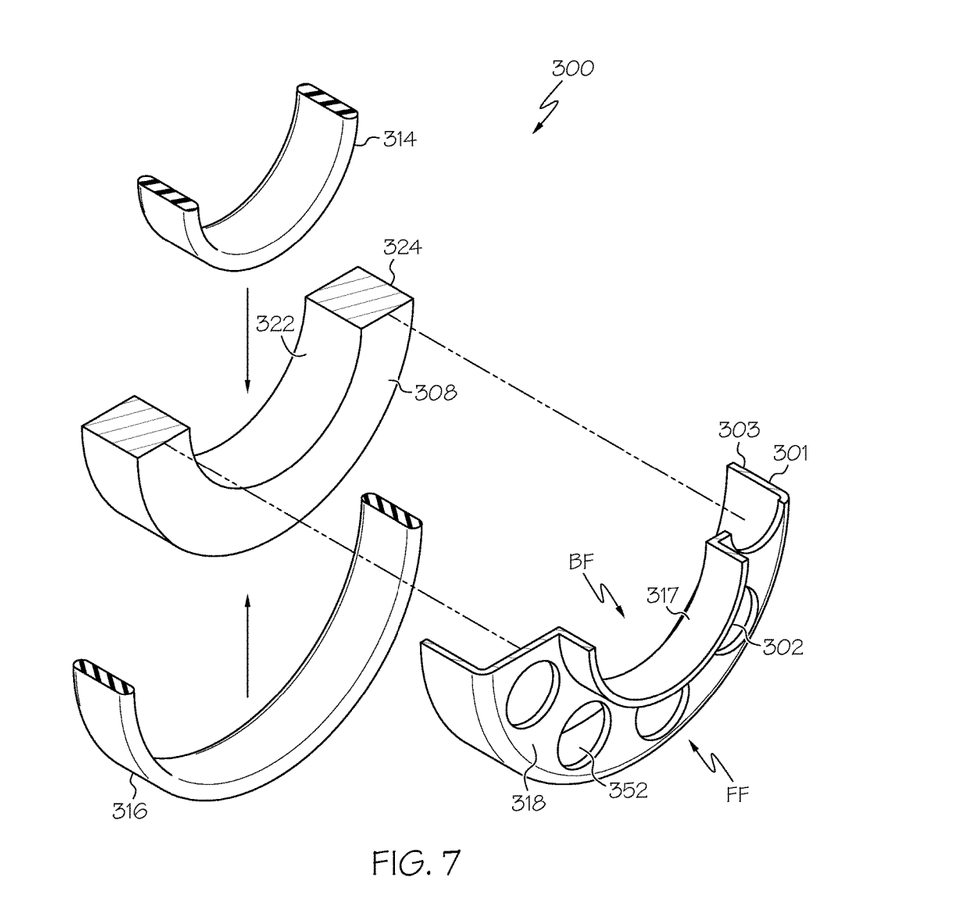
FIG. 7 is a perspective, exploded, cross-sectional view taken parallel to the axis of rotation of a torsional vibration damper for a drive line.
Figure 8:
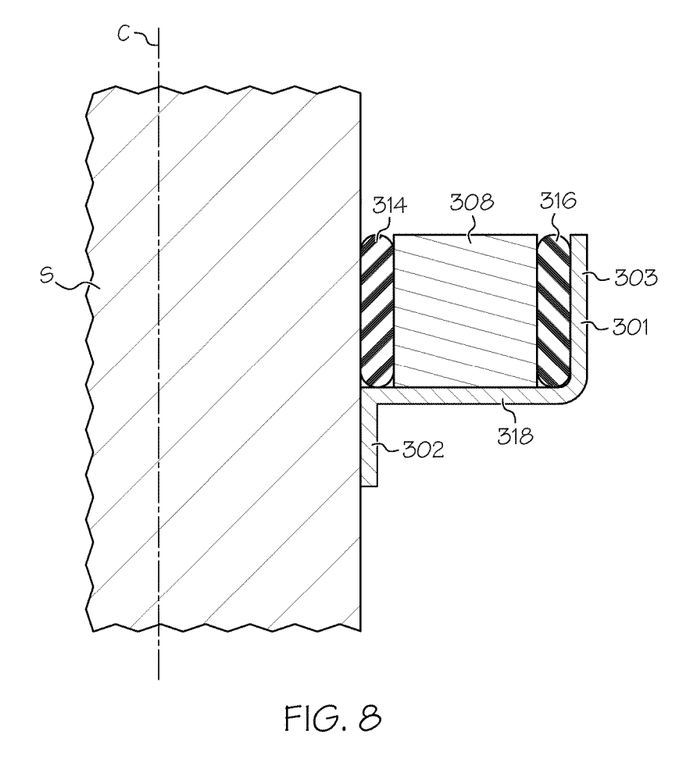
FIG. 8 is a partial, plan view in cross-section of an assembled torsional vibration damper of FIG. 7 on a shaft.

Now referring to FIGS. 7 and 8, a torsional vibration damper 300 for a drive line is illustrated, which includes a monolithic body 301 having an innermost annular wall 302 defining a bore 317 therethrough for receiving a shaft and an outer annular wall 303 concentric about the axis of rotation C and spaced radially outward relative to the innermost annular wall 302, and an inertia member 308 concentric about the axis of rotation C and positioned radially inward relative to the outer annual wall 303. Here, the innermost annular wall 302 and the outer annular wall 303 extend radially outward in opposite directions from a plate 318 of the monolithic body 301. The inertia member 308 has an inner surface facing the axis of rotation and an outer surface facing the outermost annular wall, a first elastomer member 314 seated against the inner surface 322 of the inertia member 308, and a second elastomer member 316 seated against the outer surface 224 of the inertia member 308 and in between the inertia member 308 and the outer annular wall 303. The first and second elastomer members 314, 316 operably couple the inertia member 308 to the monolithic body 301 for rotation therewith, in particular about the shaft S shown in FIG. 8.

The back face BF and front face FF of the TVD are labeled in FIG. 7. The first and second elastomer members 314, 316 may be seated against the inertia member 308 and then inserted into the monolithic body, or alternately, press fit or injected into a gap between the inertia member 308 and the outer annular wall 303 and the inertia member 308 and the shaft S after the inertia member 308 is seated in the monolithic body 301. Regardless of the assembly means, the first and second elastomer members 314, 316 are typically in compression against these respective surfaces. Accordingly, the first and second elastomer members 314, 316 non-rigidly couple the inertia member 308 to the monolithic member 301 for rotation therewith to dampen and/or absorb the vibrational frequencies of a rotating member, such as shaft S. Generally, there is no relative rotation of any components and no translation of any components relative to another component in the torsional vibration damper 300.

The plate 318 may include a plurality of voids 352 to reduce the weight of the TVD 300. The components of TVD 300 may be made of the same types of materials described above with respect to TVD 100, and as described above may mix and match the various means for retaining the elastomer member such as using a single-recessed structure, a dual-recessed structure, adhesive, and mold-bonding.

Figure 2:
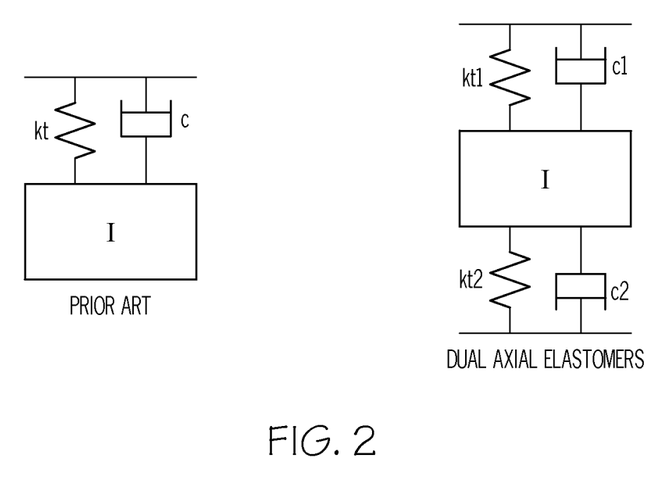
FIG. 2 is a schematic representation of the prior art and the disclosed dual axial elastomers system for the NVH structure.

The primary advantage of the dual elastomer member TVDs disclosed herein is the ability to produce direct drive TVDs with a higher frequency than those with single elastomer systems having the elastomer members concentric and spaced radially outward of the hub to non-rigidly couple an inertia member disposed concentric and spaced radially outward from the elastomer member. This can be explained by reference to FIG. 2. The schematic on the left is a prior art single elastomer system, which is mathematically represented as set forth in the background section above. The schematic on the right is the disclosed dual elastomer system, which has an increased torsion stiffness kt as represented by the express:

$$kt = kt1 + kt2 \tag{III}$$

and a corresponding frequency increase as a result of the increase in the torsional stiffness:

$$f = \frac{1}{2\pi}\sqrt{\frac{kt1 + kt2}{I}}$$

Another advantage of the disclosed TVDs is an increase in fatigue properties due to the increase in the volume of elastomer used over single elastomer constructions. This additional volume enables better heat dissipation and allows the TVD to oscillate at a higher amplitude without failure.

Although the invention is shown and described with respect to certain embodiments, it is obvious that modifications will occur to those skilled in the art upon reading and understanding the specification, and the present invention includes all such modifications.

What is claimed is:

1. A torsional vibration damper comprising:
   a monolithic body having an axis of rotation, having an innermost annular wall defining a bore therethrough for receiving a shaft, and having an outer annular wall concentric about the axis of rotation and spaced radially outward relative to the innermost annular wall by a plate, wherein the outer annular wall and the plate partially define a cavity, and the cavity has voids defined by the plate;
   an inertia member concentric about the axis of rotation and positioned radially inward relative to the outer annual wall within the cavity of the monolithic body, the inertia member having an inner surface facing the axis of rotation, an outer surface facing the outer annular wall, and opposing surfaces extending between the inner surface and the outer surface;
   a first elastomer member seated against the inner surface of the inertia member; and
   a second elastomer member seated against the outer surface of the inertia member and in between the inertia member and the outer annular wall; and no elastomer members seated against both of the opposing surfaces of the inertia member;
wherein the first and second elastomer members are press-fit or injected into the cavity and are in compression against and between the inertia member and the monolithic body as dual axial elastomers, thereby non-rigidly coupling the inertia member to the monolithic body for rotation therewith.

2. The torsional vibration damper of claim 1, wherein the outer annular wall is concentric about the innermost annual wall and spaced radially outward therefrom, thereby defining an annular cavity therebetween.

3. The torsional vibration damper of claim 2, wherein the inertia member is seated in the annular cavity with the first elastomer member in compression between the inertia member and the innermost annular wall.

4. The torsional vibration damper of claim 3, wherein at least one of the first and second elastomer members is adhesively bonded or is mold-bonded to the inertia member.

5. The torsional vibration damper of claim 3, wherein the inertia member has a generally I-shaped cross-section taken parallel to the axis of rotation and the first and second elastomer members are seated in opposing recesses defined by the generally I-shaped cross-section of the inertia member.

6. The torsional vibration damper of claim 1, wherein the monolithic body further comprises an intermediate annular wall concentric about the innermost annular wall and positioned between the innermost annular wall and the outer annular wall; wherein the inertia member is seated between the intermediate annular wall and the outer annular wall with the first elastomer member in compression between the inertia member and the intermediate annular wall and the second elastomer member in compression between the inertia member and the outer annular wall.

7. The torsional vibration damper of claim 6, wherein at least one of the first and second elastomer members is adhesively bonded or is mold-bonded to the inertia member.

8. The torsional vibration damper of claim 6, wherein the inertia member has a generally I-shaped cross-section taken parallel to the axis of rotation and the first and second elastomer members are seated in opposing recesses defined by the generally I-shaped cross-section of the inertia member.

9. The torsional vibration damper of claim 6, wherein the outer annular wall has a radially outermost surface defining a belt engaging surface.

10. The torsional vibration damper of claim 9, wherein the belt engaging surface comprises ribs for engaging an endless belt.

11. A front end accessory drive system comprising a torsional vibration damper of claim 6.

12. The torsional vibration damper of claim 1, wherein the innermost annular wall and the outer annular wall extend radially outward in opposite directions from the plate of the monolithic body, and the first elastomer member is in compression between the inertia member and the shaft.

13. The torsional vibration damper of claim 12, wherein at least one of the first and second elastomer members is adhesively bonded or is mold-bonded to the inertia member.

14. The torsional vibration damper of claim 12, wherein the inertia member has a generally I-shaped cross-section taken parallel to the axis of rotation and the first and second elastomer members are seated in opposing recesses defined by the generally I-shaped cross-section of the inertia member.

15. A dual axial elastomer torsional vibration damper consisting of:
a monolithic body having an axis of rotation, an innermost annular wall defining a bore therethrough for receiving a shaft, and an outer annular wall concentric about the axis of rotation and spaced radially outward relative to the innermost annular by a plate, wherein the outer annular wall and the plate partially define a cavity, and the cavity has voids defined by the plate;
an inertia member concentric about the axis of rotation and positioned radially inward relative to the outer annual wall within the cavity of the monolithic body, the inertia member having an inner surface facing the axis of rotation and an outer surface facing the outer annular wall;
a first elastomer member seated against the inner surface of the inertia member; and
a second elastomer member seated against the outer surface of the inertia member and in between the inertia member and the outer annular wall;
wherein the first and second elastomer members are press-fit or injected into the cavity and are in compression against and between the inertia member and the monolithic body as dual axial elastomers, thereby non-rigidly coupling the inertia member to the monolithic body for rotation therewith.

16. The torsional vibration damper of claim 15, wherein the outer annular wall is concentric about the innermost annual wall and spaced radially outward therefrom, thereby defining an annular cavity therebetween.

17. The torsional vibration damper of claim 15, wherein the monolithic body further comprises an intermediate annular wall concentric about the innermost annular wall and positioned between the innermost annular wall and the outer annular wall; wherein the inertia member is seated between the intermediate annular wall and the outer annular wall with the first elastomer member in compression between the inertia member and the intermediate annular wall and the second elastomer member in compression between the inertia member and the outer annular wall.

18. The torsional vibration damper of claim 17, wherein at least one of the first and second elastomer members is adhesively bonded or is mold-bonded to the inertia member.

19. The torsional vibration damper of claim 17, wherein the inertia member has a generally I-shaped cross-section taken parallel to the axis of rotation and the first and second elastomer members are seated in opposing recesses defined by the generally I-shaped cross-section of the inertia member.

20. The torsional vibration damper of claim 17, wherein the outer annular wall has a radially outermost surface defining a belt engaging surface.

* * * * *